United States Patent
Haga et al.

(10) Patent No.: US 6,842,982 B2
(45) Date of Patent: Jan. 18, 2005

(54) METHOD OF PRODUCING BUSHING

(75) Inventors: Yusuke Haga, Osaka (JP); Toru Okabe, Osaka (JP); Nobuaki Haga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/612,160

(22) Filed: Jul. 2, 2003

(65) Prior Publication Data

US 2004/0020052 A1 Feb. 5, 2004

(30) Foreign Application Priority Data

Jul. 25, 2002 (JP) ........................................ 2002-249757

(51) Int. Cl.⁷ .............................................. B21D 53/10
(52) U.S. Cl. .......................... 29/898.057; 29/898.056; 29/898.054; 72/355.2; 72/355.6
(58) Field of Search ...................... 29/898.054, 898.056, 29/898.057, 557; 72/355.2, 370.14, 370.15, 355.4, 355.6

(56) References Cited

U.S. PATENT DOCUMENTS

| 1,402,508 A | * | 1/1922 | Lothrop | .................. | 29/898.066 |
| 1,466,953 A | * | 9/1923 | Loomis | .................... | 29/898.11 |
| 1,722,389 A | * | 7/1929 | Opie et al. | ............. | 29/888.041 |
| 2,431,764 A | * | 12/1947 | McCann | ...................... | 474/231 |
| 3,491,576 A | | 1/1970 | Oguri et al. | | |

FOREIGN PATENT DOCUMENTS

| EP | 0534818 | * | 3/1993 |
| FR | 772.791 | | 5/1934 |
| GB | 646806 | | 11/1950 |
| JP | 55030385 | | 4/1980 |
| JP | 58-179529 | * | 10/1983 |
| JP | 61296937 | | 12/1986 |
| JP | 2000-218446 | | 8/2000 |

* cited by examiner

Primary Examiner—Eric Compton
(74) Attorney, Agent, or Firm—Howson and Howson

(57) ABSTRACT

By press-fitting a cylindrical blank into a die with one of a pair of punches, and at the same time press-fitting small diameter end portions and tapered portions of the pair of punches into both ends of the cylindrical blank while restraining both end surfaces of the blank with cylindrical members movable on the outsides of the punches, the external circumferential surface of the blank is finish molded to the required diameter by the internal circumferential surface of the die and, at the same time, tapered surfaces are formed on the inner circumferential surface in both ends of the blank. The process produces a bushing with its internal surfaces accurately coaxial, and with the external surface accurately formed to the required diameter.

2 Claims, 3 Drawing Sheets

Fig.1(III)
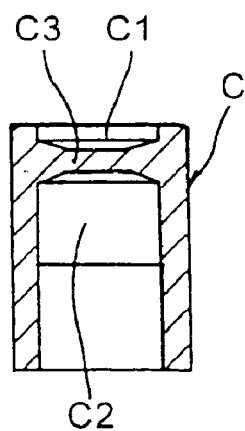

Fig.3(III) Prior Art
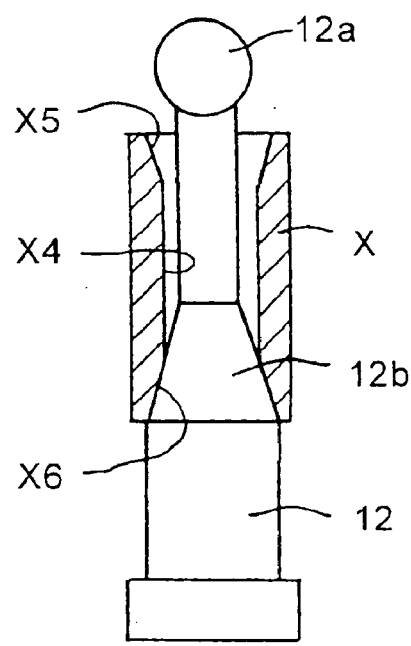

METHOD OF PRODUCING BUSHING

FIELD OF THE INVENTION

This invention relates to a method of producing a roller chain bushing having tapered internal circumferential surfaces at the both of its ends.

BACKGROUND OF THE INVENTION

An example of a conventional method of producing this type of busing is described in Japanese Laid-open Patent Publication No. 2000-218446. The method comprises the series of steps depicted in FIG. 3. First, a cylindrical body is formed in a press. The cylindrical body X, having the required height, has an intermediate base and recesses X1 and X2 at the upper and lower portions respectively. A tapered internal circumferential surface X5 is formed at one end portion of the cylindrical body X by punching the intermediate base X3 with the front end 11a of a punch 11, and, at the same time, pressing a tapered portion 11b, formed at the proximal side of the punch 11, into one end portion of the internal circumferential surface X4 of the cylindrical body X. After inverting the cylindrical body X, a tapered surface X6 is formed at the other end of the internal circumferential surface X4 by pressing another punch 12 into the cylindrical body, punch 12 having a sphere 12a at its front end, and including a tapered portion 12b.

In the conventional production method described above, the tapered surfaces X5 and X6 are formed in sequential steps. Accordingly, as the tapered surfaces are formed, the remaining portions of the internal circumferential surface are not restrained. Consequently, displacement and deformation are liable to occur in the cylindrical body X during the formation of the tapered surfaces, and, as a result, it is difficult to make the internal circumferential surface X4 and the tapered surfaces X5 and X6 coaxial with one another. When there is a displacement between the central axis of the internal circumferential surface X4 and the central axes of the tapered surfaces X5 and X6, it is not possible to achieve accurate assembly of the bushing in a hole in an inner plate of a roller chain. This results in increased friction between the bushing and its associated pin in the roller chain. Moreover, because an accurate parallel relationship between the bushing axis and the pin axis is not maintained, the fatigue strength of the inner and outer plates is reduced.

A general object of this invention is to solve the above-described problems. More particularly, an object of the invention is to provide a method for producing a bushing, in which an accurate coaxial relationship between the internal circumferential surface of the bushing and the tapered surfaces at both end portions of the bushing is achieved, and in which the external circumferential surface of the bushing, having the required diameter, can be accurately formed.

SUMMARY OF THE INVENTION

In accordance with the invention, a bushing is formed by the following steps. First a solid, cylindrical blank having the required length is press formed into a hollow cylindrical blank having required inner and outer diameters, and having end portions. Then, a finishing die and a pair of punches are used to complete the formation of the bushing. The finishing die has an internal circumferential surface with a diameter the same as, or slightly smaller than, the outer diameter of the hollow cylindrical blank. Each of the punches has a small diameter end portion which has the same diameter as the inner diameter of the hollow cylindrical blank, a large diameter portion, which has a diameter the same as the diameter of the internal circumferential surface of said die, and a tapered portion provided between the large diameter portion and the small diameter end portion. The hollow cylindrical blank is press-fit into the die with one of the punches, and, at the same time, the small diameter end portions and tapered portions of the pair of punches are press-fit into both end portions of the hollow cylindrical blank while both end surfaces of the hollow cylindrical blank are restrained by punch side members. By this process, the outer circumferential surface of the cylindrical blank is simultaneously molded and finished to the required diameter, and, at the same time, tapered surfaces are formed on inner circumferential surfaces of both end portions of the cylindrical blank.

Optionally, in a later step, an internal circumferential surface of said hollow cylindrical blank other than the tapered internal circumferential surfaces at both end portions thereof is subjected to sizing.

DETAILED DESCRIPTION OF THE PREFERRED EMBODIMENTS

Figure 1I:
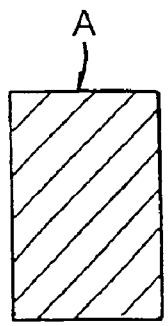
FIG. 1 is an schematic view illustrating the steps employed in the production of a bushing according to the invention.
Figure 1:
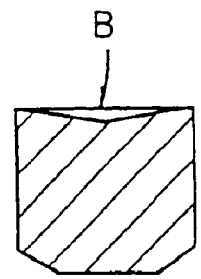
Figure 1:
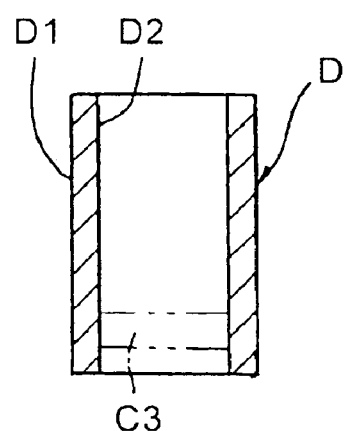
Figure 1V:
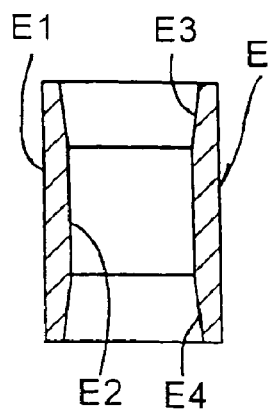

As shown in FIG. 1, a solid, cylindrical blank A is obtained, preferably by cutting off a required length of a cylindrical bar. The solid cylindrical blank is transformed to an intermediate molded product B by using a punch and a die. A second intermediate molded product C, which has an intermediate base C3, is obtained by inverting the first intermediate molded product B, setting it in a die, and forming recesses C1 and C2 in both end portions of the first intermediate product B by punching both ends thereof by means of a pair of punches.

The second intermediate product C is then inverted and set in a die, and the intermediate base C3 is punched with a punch to produce a hollow cylindrical, third, intermediate molded product D, which is a cylindrical blank.

While punching the intermediate base C3, the internal circumferential surface of the second intermediate molded product C is subjected to sizing, so that highly accurate dimensioning is achieved.

After punching the intermediate base C3, the third intermediate molded product D is press-fit into a die, and, at the same time, small diameter front end portions and tapered portions of a pair of punches are press-fit into both ends of the third intermediate molded product D. In the die, the external circumferential surface D1 of the third intermediate molded product D is formed so that it has the required outer diameter, and tapered surfaces E3 and E4 are formed at the same time at both ends of the internal circumferential surface D2. The resulting bushing E is shown in FIG. 1.

Figure 2:
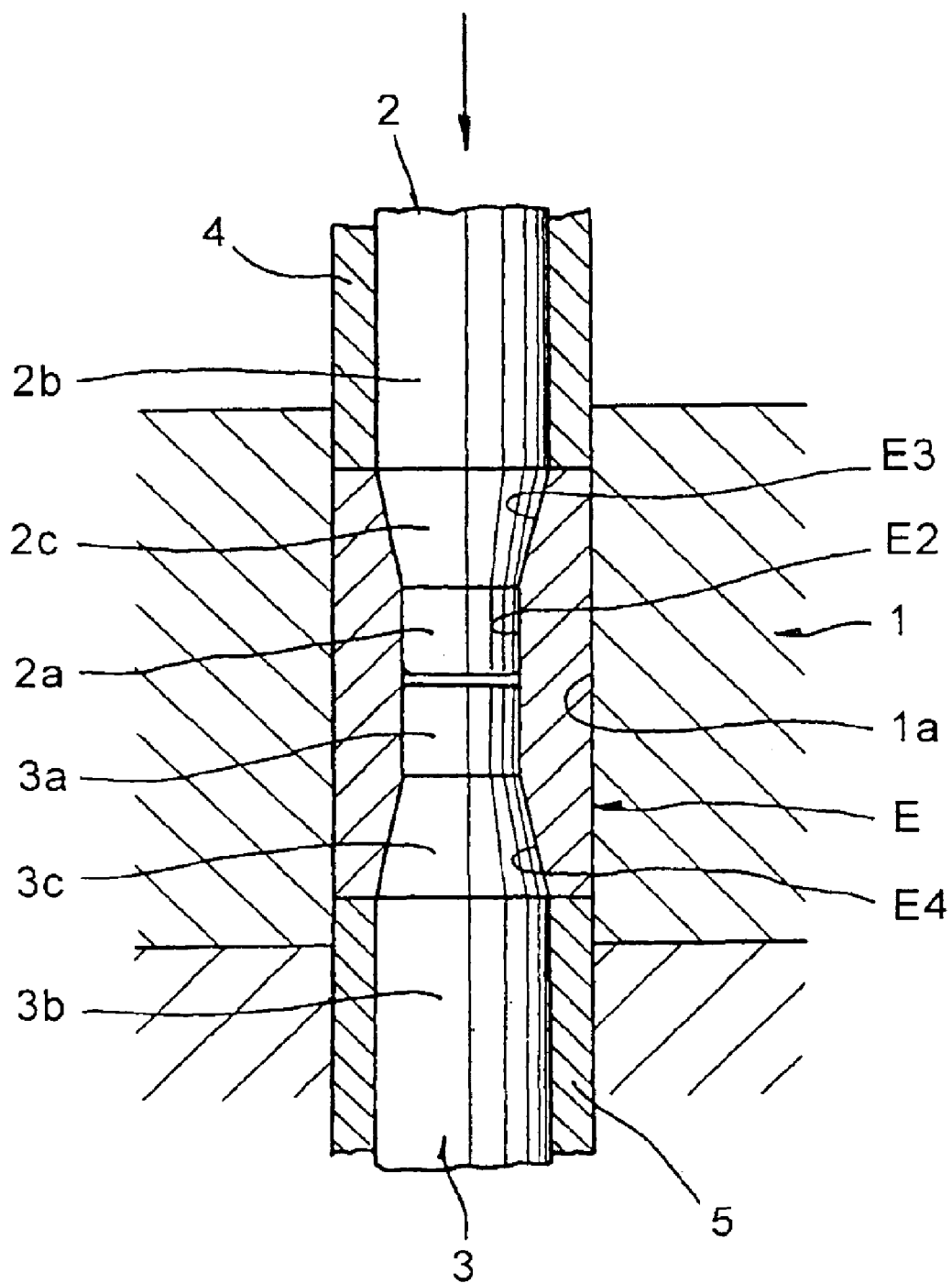
FIG. 2 is an sectional view of a tapered surface mold for forming the bushing.
Figure 3I:
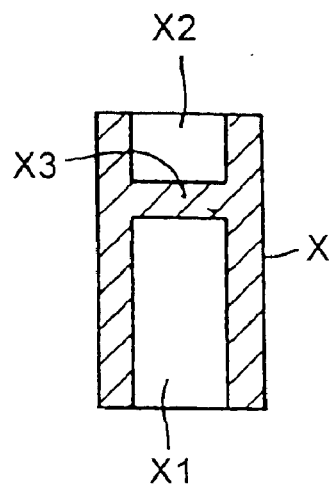
FIG. 3 is an schematic view illustrating a conventional method of producing a bushing.
Figure 3:
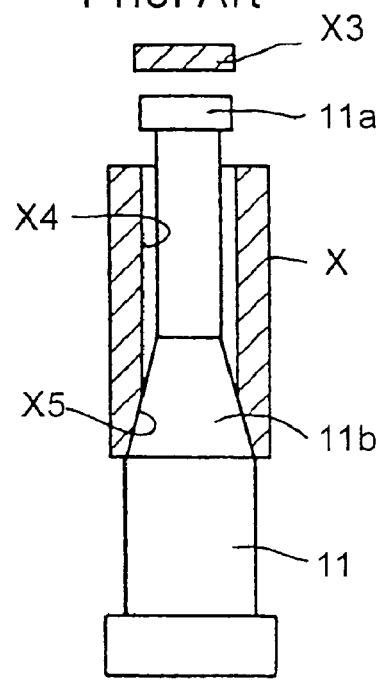

As shown in FIG. 2, a finishing die 1 has an internal circumferential surface 1a with a diameter the same as, or slightly smaller than, the outer diameter of the third intermediate molded product D. Punches 2 and 3 have small diameter end portions 2a and 3a, which have the same diameter as the inner diameter of the third intermediate molded product D. The punches also have large diameter portions 2b and 3b, which are inserted into the die 1, and tapered portions 2c and 3c, between the large diameter portions and the small diameter end portions. The third intermediate molded product D is press-fit into the die 1 using one of the two punches, for example punch 2. At the same time, the small diameter end portions 2a and 3a, and the tapered portions 2c and 3c, of the pair of punches 2 and 3, are press fit into both end portions of the third intermediate molded product D, while the end surfaces of the intermediate product D are restrained by cylindrical members 4 and 5, which are movable axially on the outsides of the punches 2 and 3. Accordingly, the external circumferential surface 1a of the third intermediate molded product D is finish molded in the required diameter by the internal circumferential surface la of the die 1, and at the same time, tapered surfaces E3 and E4 are formed on the inner circumferential surface D2 at both ends of the third intermediate molded product D.

Using the above-described molding method, the external circumferential surface E1 of the bushing E can be formed and finished in the required diameter with high precision and without widening the end portions of the bushing E. In the bushing E, the central axes in the external and internal circumferential surfaces E1 and E2 accurately coincide with each other, and the central axes of the internal surface E2 and the tapered surfaces E3 and E4 are accurately aligned with one another.

As a result, highly accurate assembly can be achieved when the bushing E is press-fit into a hole in an inner plate of a roller chain.

The internal circumferential surface E2, between the tapered surfaces E3 and E4 in the bushing E, may be subjected to sizing in a subsequent step, following formation of the tapered surfaces by punching. Accordingly, even if a few wrinkles are generated on the internal circumferential surface D2 in the process of forming the tapered surfaces E3 and E4, the wrinkles can be removed, to produce a high precision bushing E. Furthermore, biased hitting of the bushing E on a pin inserted into the bushing is reduced during the assembly of the roller chain, and wear in the bushing E is suppressed.

It is preferable that the bushings E be continuously press-formed from wire by a multi-step type press-molding machine including a cutter which cuts off fixed lengths of wire as blanks, and plural sets of dies and punches, which sequentially form bushings from the blanks.

The invention comprises the following steps. First, a solid, cylindrical blank having the required length is press formed to form a hollow cylindrical blank having required inner and outer diameters, and having end portions. Then, by using a finishing die having an internal circumferential surface with a diameter the same as or slightly smaller than the outer diameter of the hollow cylindrical blank, and a pair of punches having small diameter end portions which have the same diameters as the inner diameter of the hollow cylindrical blank, large diameter portions, which have diameters the same as the diameter of the internal circumferential surface of the die, and tapered portions provided between the large diameter portions and the small diameter end portions respectively, the hollow cylindrical blank is press-fit into the die with one of the punches and, at the same time, small diameter end portions and tapered portions of the pair of punches are press-fit into both end portions of the hollow cylindrical blank while both end surfaces of the press-fitted hollow cylindrical blank are restrained by punch side members. The outer circumferential surface of the cylindrical blank is finish-molded to the required diameter, and, at the same time, tapered surfaces are formed on inner circumferential surfaces of both end portions of the cylindrical blank.

Therefore, the external circumferential surface of the bushing can be simultaneously formed, and finished to the required diameter with high precision, and a bushing can be produced in which the axes of the external and internal circumferential surfaces are accurately aligned, and the central axes of the internal surface and the tapered surfaces are also accurately aligned. As a result, highly accurate assembly can be performed by press-fitting the bushing into a hole of an inner plate in a roller chain. Furthermore, since the internal circumferential surface of the bushing has improved straightness, wear between the internal circumferential surface and a pin received in the bushing in sliding relationship, can be reduced, and the wear life of the roller chain is improved.

Furthermore, in a later step, the part of the internal circumferential surface of the bushing other than the tapered surfaces may be subjected to sizing. When this is done, a highly accurate bushing having no wrinkles on the sized internal circumferential surface thereof can be produced. The straightness in the internal circumferential surface of the bushing is further improved, and the wear life of the roller chain which comprises the bushing is further improved. Finally, the parallelism between the central axis of the bushing and the central axis of the pin is improved. As a result, the tension forces acting on the inner and outer plates to which the bushing and pin are press-fit, are made more uniform, and fatigue strength in the roller chain is also improved.

What is claimed is:

1. A method of producing a bushing for a roller chain having a pair of end portions at opposite ends thereof and tapered internal circumferential surfaces at both said end portions, the method comprising the steps of:

press-forming a solid cylindrical blank of a required length to form a hollow cylindrical blank having required inner and outer diameters, and having end portions;

thereafter, by using a finishing die having an internal circumferential surface with a diameter the same as or slightly smaller than the outer diameter of said hollow cylindrical blank, and a pair of punches having small diameter cylindrical end portions which have the same diameters as the inner diameter of said hollow cylindrical blank, large diameter portions, which have diameters the same as the diameter of the internal circumferential surface of said die, and tapered portions provided between said large diameter portions and said small diameter end portions respectively, the small diameter cylindrical end portion of each punch projecting axially in a first direction from a narrow end of the tapered portion thereof, and the large diameter portion of each punch extending axially from a wide end of the tapered portion thereof in a direction opposite to said first direction, press-fitting said hollow cylindrical blank into the die with one punch of said pair of punches and, at the same time, press-fitting the small diameter cylindrical end portions and tapered portions of the pair of punches into both end portions of said hollow cylindrical blank while restraining both end surfaces of the press-fitted hollow cylindrical blank with cylindrical punch side members surrounding the large diameter portions of the punches and movable axially on the outsides of the punches;

whereby the outer circumferential surface of the cylindrical blank is finish-molded in the required diameter, and, at the same time, tapered surfaces are formed on inner circumferential surfaces of both end portions of the cylindrical blank.

2. A method of producing a bushing according to claim 1, in which, in a later step, an internal circumferential surface of said hollow cylindrical blank other than the tapered internal circumferential surfaces at both end portions thereof is subjected to sizing.

* * * * *